United States Patent
Murayama et al.

[11] Patent Number: 5,749,244
[45] Date of Patent: May 12, 1998

[54] ABSORPTION TYPE REFRIGERATOR

[75] Inventors: Tomoyuki Murayama, Tatebayashi; Syoichi Turuta, Ohta; Sumio Ikeda, Ohra-gun; Toshiyuki Hoshino, Ohra-gun; Shuji Ishizaki, Ohra-gun; Shinichi Uegomori, Ohra-gun, all of Japan

[73] Assignee: Sanyo Electric Co., Ltd., Osaka-fu, Japan

[21] Appl. No.: 824,357

[22] Filed: Mar. 25, 1997

[30] Foreign Application Priority Data

Mar. 29, 1996 [JP] Japan .................. 8-077320

[51] Int. Cl.[6] .................................. F25B 15/00
[52] U.S. Cl. ......................... 62/476; 62/324.2
[58] Field of Search ................ 62/476, 101, 324.2, 62/105, 485, 497, 495

[56] References Cited

U.S. PATENT DOCUMENTS

| | | | |
|---|---|---|---|
| 5,085,271 | 2/1992 | Yanadori et al. | 165/104.12 |
| 5,127,470 | 7/1992 | Inaba et al. | 165/104.12 |

FOREIGN PATENT DOCUMENTS

| | | | |
|---|---|---|---|
| 55-32985 | 3/1980 | Japan . | |
| 406123515 | 5/1994 | Japan | 62/324.2 |
| 7218016 | 8/1995 | Japan . | |

*Primary Examiner*—William Doerrler
*Attorney, Agent, or Firm*—Weingarten, Schurgin, Gagnebin & Hayes LLP

[57] ABSTRACT

An absorption type refrigerator capable of returning an abnormally high temperature of heating water or an abnormally low temperature of cooling water to a normal temperature without stopping or switching the operation of the refrigerator is structured such that return heating water 46b is heated with refrigerant vapor 7a in a heater 41 and is provided to a heating load 310. When the temperature of the heating water 46a becomes abnormally high because the heating load 310 is small or zero, the switch valve V1 is opened to cool part of heating water 46a with part of cooling water 32 for heat radiation so as to reduce the temperature of the heating water 46a to a normal temperature. The heat of the heating water 46a may also be radiated by an air-cooled heat exchanger provided along the passages 44 and 45 of the heating water 46a. When the temperature of the cooling water 32 becomes abnormally low at the start of the operation of supplying cooling water 35b because the outside temperature is too low, the switch valve V1 is opened to heat part of the cooling water 32a with part of the heating water 46a in a radiator 51 to increase the temperature of the cooling water 32a to a normal temperature.

6 Claims, 6 Drawing Sheets

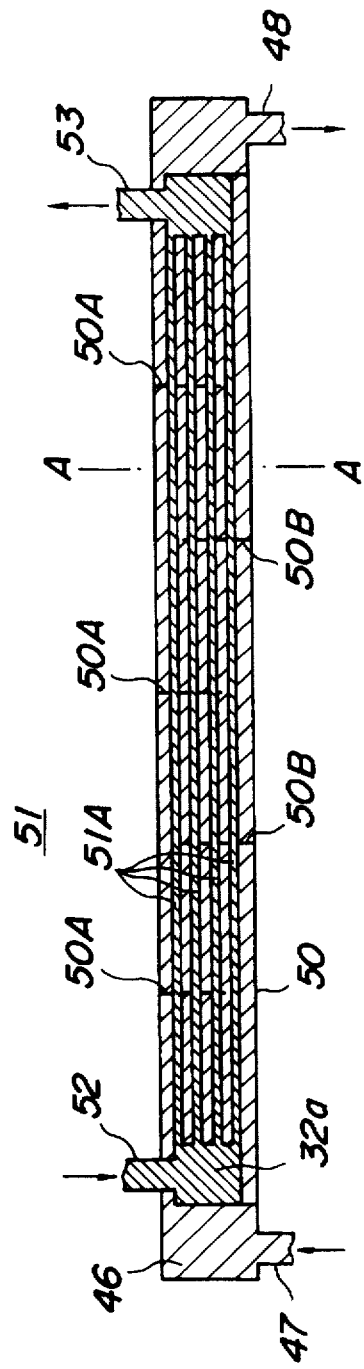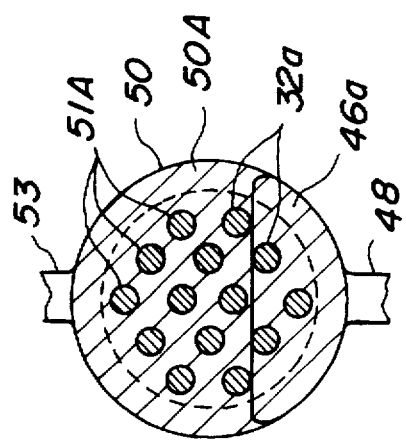

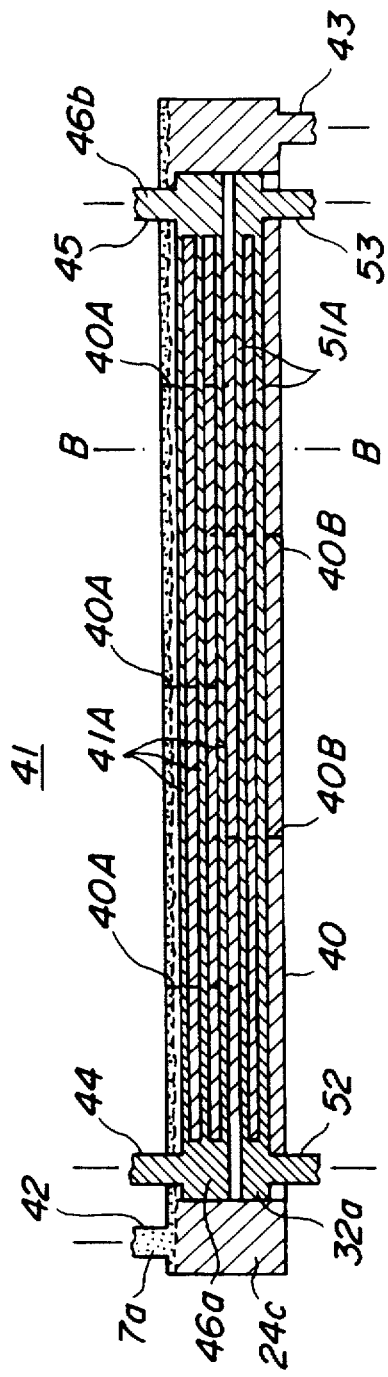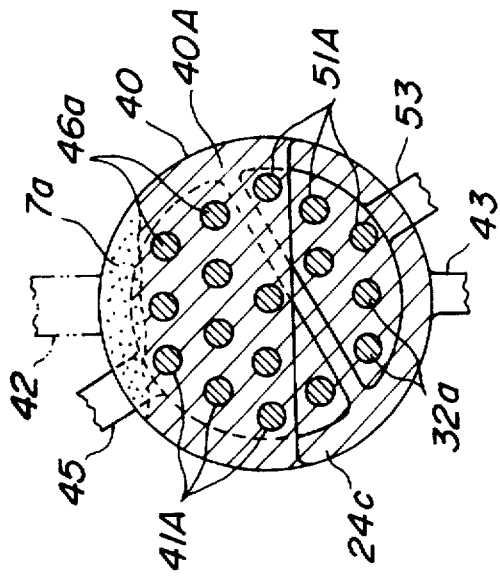

ABSORPTION TYPE REFRIGERATOR

BACKGROUND OF THE INVENTION

1. Field of the Invention

This invention relates to an absorption type refrigerator structured such that an abnormal temperature of heating water heated by an apparatus or an abnormal temperature of cooling water for cooking key parts of the apparatus is returned to a normal temperature.

2. Background Art

The configuration of an absorption refrigerator 100 as shown in FIG. 5 which uses an aqueous solution of lithium bromide prepared by mixing lithium bromide as an absorber and water as a medium is disclosed in Laid-open Japanese Patent Application Nos. Sho 55-32985 and Hei 7-218016 as an absorption type refrigerator.

In FIG. 5, portions shown by solid lines are pipe lines of liquids such as a refrigerant solution, an absorption solution and cooling water and portions shown by double lines are pipe lines of refrigerant vapor. A circulation system of the absorption solution is first described with an absorption solution having a low concentration which accumulates in the bottom of an absorber 1, namely, a diluted solution 2a as a starting point.

The diluted solution 2a enters a high-temperature regenerator 5 through a pipe line 3 by means of a pump P1. Since the high-temperature regenerator 5 is heated by a heater 6 such as a burner from the bottom, a refrigerant contained in the diluted solution 2a evaporates and thus the diluted solution 2a separates into a high-temperature absorption solution having an intermediate concentration, that is, an intermediate solution 2b and refrigerant vapor 7a.

The high-temperature intermediate solution 2b enters a high-temperature heat exchanger 9 through a pipe line 8. In the heat exchanger 9, the high-temperature intermediate solution radiates heat by providing heat to the diluted solution 2a passing through the pipe line 3 to lower its temperature and then enters a low-temperature regenerator 11 through a pipe line 10.

In the low-temperature regenerator 11, since the intermediate solution 2b is heated by supplying the refrigerant vapor 7a into radiator pipes 11A in the low-temperature regenerator 11 for heating the intermediate solution 2b through a pipe line 21, the refrigerant contained in the intermediate solution 2b evaporates and thus the intermediate solution 2b separates into a high-temperature absorption solution having a high concentration, namely, a concentrated solution 2c and refrigerant vapor 7b.

The high-temperature concentrated solution 2c enters a low-temperature heat exchanger 13 through a pipe line 12. In the heat exchanger 13, the high-temperature concentrated solution 2c radiates heat by providing heat to the diluted solution 2a passing through the pipe line 3 to lower its temperature to an intermediate temperature, enters a spray unit 1A in the absorber 1 through a pipe line 14, and is sprayed from a large number of holes of the spray unit 1A.

The thus sprayed concentrated solution 2c is diluted by absorbing the refrigerant vapor 7c coming from an adjacent evaporator 26 when it falls down along the outside of each cooling pipe 1B and is cooled by cooling water 32a circulating in the cooling pipe 1B in the absorber 1 to become a low-temperature diluted solution 2a again. Thus, one cycle of the circulation of the absorption solution is ended and this cycle is repeated.

A description is subsequently given of the circulation system of the refrigerant with the refrigerant vapor 7c which enters the absorber 1 as a starting point. The refrigerant vapor 7c is, as described in the circulation system of the absorption solution above, absorbed into the concentrated solution 2c sprayed by the spray unit 1A in the absorber 1 and is separated from the diluted solution 2a in the high-temperature regenerator 5 to become refrigerant vapor 7a.

The refrigerant vapor 7a enters a radiation pipe 11A in the low-temperature regenerator 11 through a pipe line 21, radiates heat by providing heat to the intermediate solution 2b, is condensed into a refrigerant solution 24a, and enters the bottom of a condenser 23 through a pipe line 22.

The condenser 23 cools the refrigerant vapor 7b coming through a large number of passages 11B between the condenser 23 and the adjacent low-temperature regenerator 11 with cooling water 32a passing through a cooling pipe 23A in the condenser 23 to condense the refrigerant vapor 7b into a low-temperature refrigerant solution 24a. The refrigerant solution 24a enters the evaporator 26 through a pipe line 25 and accumulates in the bottom of the evaporator 26 as a refrigerant solution 24b.

The pump P2 supplies the refrigerant solution 24b to the spray unit 26A through a pipe line 28 and sprays it from a large number of holes in the spray unit 26A repeatedly. The sprayed refrigerant solution 24b cools a heat operated fluid passing through a heat exchanger 26B in the evaporator 26, namely, return cold or hot water 35a. During cooling, the refrigerant solution 24b evaporates by absorbing heat from the return cold or hot water 35a to become refrigerant vapor 7c, passes through a large number of passages 26C between the evaporator 26 and the adjacent absorber 1, and returns to the absorber 1. Thus one cycle of the circulation of the refrigerant is ended and this cycle is repeated.

By the above operation, a double effect cooling is carried out such that, while the absorption solution and the refrigerant, namely, the heat operation fluids are circulated by the double regeneration operations of the high-temperature regenerator 5 and the low-temperature regenerator 11, a heat operated fluid supplied from the pipe line 36, namely, return cold or hot water 35a is cooled by the heat exchange pipe 26B in the evaporator 26, i.e., a heat exchange pipe, and cold or hot water 35b is supplied from the pipe line 37 to a cooling load 210 such as a cooling unit, i.e., an indoor cooling unit by the pump P11. The cooling load is mainly used for cooling.

The return cooling water 32b obtained after the cooling water 32a is heated by cooling each target site passes through a pipe line 34, is supplied to a radiator 230 such as a cooling tower for air cooling or an air-cooled heat exchanger to radiate heat and become low-temperature cooling water 32a again, and supplied to the pipe line 31 by the pump P21.

Further, there are provided a refrigerant circulation route in which the refrigerant vapor 7a generated in the high-temperature regenerator 5 is supplied to a heater 41 from a pipe line 42 to heat a heat operation fluid, i.e., return heating water 46b circulating in a heating pipe 41A with the refrigerant vapor 7a to change it into heating water 46a, whereby the refrigerant solution 24c which is the liquified refrigerant vapor 7a is returned again to the high-temperature regenerator 5 from a pipe line 43 provided with a hot water drain control valve V41; and a heating water circulation route in which return heating water 36b whose temperature is lowered after heating water 46a heated by the refrigerant circulation route is supplied to a heating load 310 through a pipe line 44 by a pump P31 to heat the heating load 310 is returned to the heating pipe 41A through a pipe line 45. The heating load is mainly used for heating.

The absorption type refrigerator 100 is structured to carry out double-effect cooling as described above. As shown by a dotted line in FIG. 5, a switch valve V11 provided in a pipe line 39 for supplying the refrigerant vapor 7a evaporated in the high-temperature regenerator 5 and the high-temperature intermediate solution 2b to be supplied into the high-temperature heat exchanger 9 to the evaporator 26 is opened to return them to the evaporator 26 directly and a switch valve V12 provided in a pipe line 38 connected to the pipe lines 28 and 3 is opened to mix the refrigerant solution 24b which accumulates in the bottom of the evaporator 26 with the absorption solution 2a so that, without using the low-temperature regenerator 11, the heat operated fluid, i.e., return cold or hot water 35a provided from the pipe line 36 is heated by a heat exchange pipe 26B, i.e., heat exchange pipe in the evaporator 26 while the circulation of the absorption solution and the circulation of the refrigerant are carried out by the operation of the high-temperature regenerator 5 only. Thus switching operation (to be referred to as "cooling/heating switching structure" hereinafter) is made possible to change the cooling load 210 into a heating load so as to supply hot water in place of cold water. In this case, the heating load is also mainly used in a heat exchanger for heating.

A control unit 70 of the absorption type refrigerator 100, as shown in FIG. 6, for example, is formed of a commercial CPU board which is mainly composed of a control processing unit (to be abbreviated as CPU hereinafter) such as a microcomputer. The control unit is structured such that it carries out required control processing based on detection signals obtained by detecting the state of each required portion and operation signals provided from an operation unit 76 for inputting operation conditions and carries out target operation by supplying control signals to portions to be controlled.

In FIG. 6, detection signals obtained by detecting the state of each required portion and operation signals input by operating the operation unit 76 are stored in a working memory 73 such as a RAM through an input/output port 71. A display unit 77 displays required ones out of the states of control processing in the CPU 70A.

The CPU 70A outputs control signals obtained by processing data stored in the working memory 73, such as control signals for controlling the pumps P1, P2, P11, P21, P31 and the heater 6 based on a control processing flow program stored in a processing memory 72 such as a ROM, data stored in a data memory 74 such as electrically erasable PROM (EEPROM), data stored in the working memory 73 and data on a count value of a timer circuit 75 to portions to be controlled through the input/output port 71.

By storing the required control processing flow program in the processing memory 72, target control processing is carried out. Therefore, required switch valves and temperature detectors as well as functional portions for automatically adjusting the concentration of the refrigerant are arranged at required portions. In FIG. 5 these portions are omitted and only basic portions are illustrated.

In the above absorption type refrigerator of the prior art, when the load amount of the heating load 310 on the side of heating water 36a supplied from the heater 41 is extremely small or when the load amount is zero, the temperature of heating water 46a becomes abnormally high and an abnormally high temperature state of the heating water occurs because frictional heat generated by the rotation friction of the pump P31 and Joule heat generated by the electric resistance of a drive motor are added even when the hot water drain control valve V41 is closed to reduce the amount of heating by the heater 41. Therefore, the refrigerator involves such inconvenience that it is necessary to stop the operation of the refrigerator temporarily and to resume operation when the load amount of the heating load reaches a required amount.

Further, at the time of the start of operation of the refrigerator when cold or hot water 35b is supplied from the evaporator 26 as cold water, since the temperature of cooling water 32a becomes abnormally low as the radiator 230 is located outside and an abnormal low temperature state of the cooling water occurs, the inside of the absorber 1 is cooled too much, the absorption power thereby increases excessively, the amount of the refrigerant vapor 7c on the side of the evaporator 26 reduces, and the amount of the refrigerant solution 24b in the bottom of the evaporator 26 decreases. Therefore, the refrigerant vapor 7c is absorbed into the pump P2, whereby so-called cavitation occurs and the return cold or hot water 35a in the heat exchange pipe 26B cannot be cooled due to an excessive reduction in the amount of the refrigerant solution 24b sprayed from the spray unit 26A. As a result, the absorption type refrigerator has another inconvenience that it must be provided with a structure for heating cooling water temporarily in the radiator 230.

Therefore, it is desired that an absorption type refrigerator free from the above inconveniences be provided.

SUMMARY OF THE INVENTION

To solve the above problem, according to a first aspect of the present invention, there is provided an absorption type refrigerator for cooling an absorber in which refrigerant vapor is absorbed into an absorption solution by a first heat operation fluid and a condenser for condensing refrigerant vapor and for heating a second heat operation fluid to be provided to a heating load with high-temperature refrigerant vapor separated from the absorption solution in a regenerator, wherein the refrigerator comprises cooling means for cooling the second heat operation fluid through heat exchange between the first heat operation fluid and the second heat operation fluid when the temperature of the second heat operation fluid is higher than a predetermined temperature.

According to a second aspect of the present invention, there is provided an absorption type refrigerator which further comprises heat exchange amount control means for controlling the flow rate of the second heat operation fluid or the first heat operation fluid to be provided for the heat exchange in accordance with the temperature variations of the second heat operation fluid, in addition to the constituent elements of the refrigerator according to the first aspect of the present invention.

According to a third aspect of the present invention, there is provided an absorption type refrigerator which comprises cooling means for cooling the second heat operation fluid through heat exchange between the second heat operation fluid and the first heat operation fluid in a container for heating the second heat operation fluid with the high-temperature refrigerant vapor when the temperature of the second heat operation fluid is higher than a predetermined temperature, in place of the cooling means of the first aspect of the present invention.

According to a fourth aspect of the present invention, there is provided an absorption type refrigerator which comprises:

first cooling means for cooling the second heat operation fluid through heat exchange between the second heat operation fluid and the first heat operation fluid when the temperature of the second heat operation fluid is higher than a predetermined temperature; and second cooling means, provided along the passage of the second heat operation fluid, for cooling the second heat operation fluid with air, in place of the cooling means of the first aspect of the present invention.

According to a fifth aspect of the present invention, there is provided an absorption type refrigerator similar to the absorption type refrigerator of the first aspect of the present invention, which comprises heating means for heating the first operation fluid through heat exchange between the second heat operation fluid and the first heat operation fluid when the temperature of the first heat operation fluid is lower than a predetermined temperature.

According to a sixth aspect of the present invention, there is provided an absorption type refrigerator which comprises heating means for heating the first operation fluid through heat exchange between the second heat operation fluid and the first heat operation fluid in a container for heating the second heat operation fluid with the high-temperature refrigerant vapor when the temperature of the first heat operation fluid is lower than a predetermined temperature in place of the heating means of the fifth aspect of the present invention.

These and other objects and advantages of the present invention will become clear by the following description of preferred embodiments of the present invention with reference to the accompanying drawings.

BRIEF DESCRIPTION OF THE DRAWINGS

Out of the accompanying drawings, FIGS. 1 to 4B show preferred embodiments of the present invention and FIGS. 5 and 6 show the prior art.

FIG. 1 is a diagram of the entire configuration;

FIG. 2A is an elevational view in vertical section of key parts;

FIG. 2B is a section on line A—A of FIG. 2A;

FIG. 3 is a block diagram of the entire configuration;

FIG. 4A is an elevational view in vertical section of key parts;

FIG. 4B is a section on line B—B of FIG. 4B;

FIG. 5 is a block diagram of the entire configuration; and

FIG. 6 is a block diagram of key parts.

DETAILED DESCRIPTION OF THE PREFERRED EMBODIMENTS

Preferred embodiments of the present invention are described hereinunder with reference to FIGS. 1 to 4B. In FIGS. 1 to 4B, the same parts given the same reference symbols as in FIGS. 5 and 6 have the same functions as those of FIGS. 5 and 6. Parts denoted by the same reference symbols in FIGS. 1 to 4B have the same functions as those denoted by the same reference symbols in any one of FIGS. 1 to 4B.

[FIRST EMBODIMENT]

Figure 1:
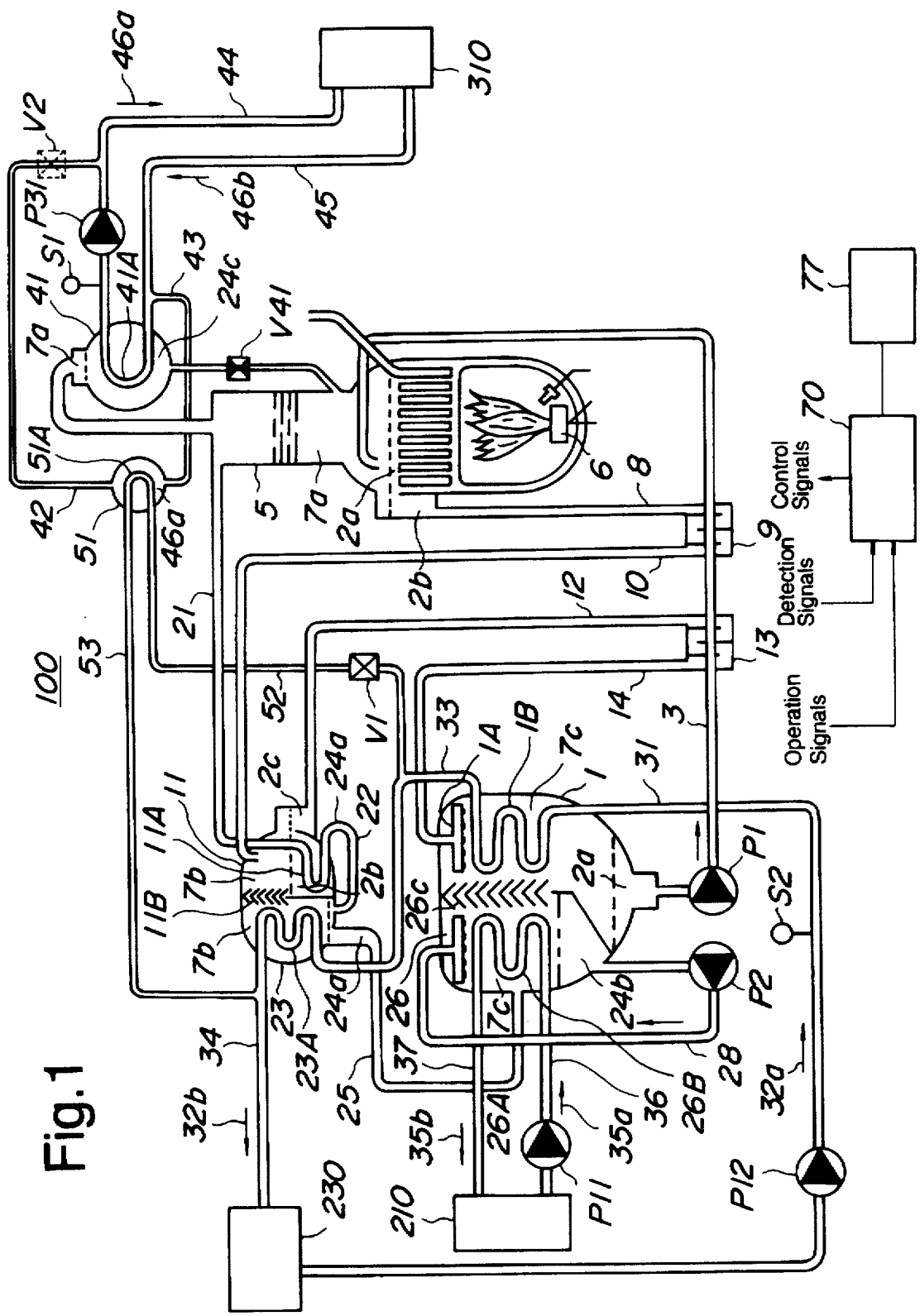
Figure 5:
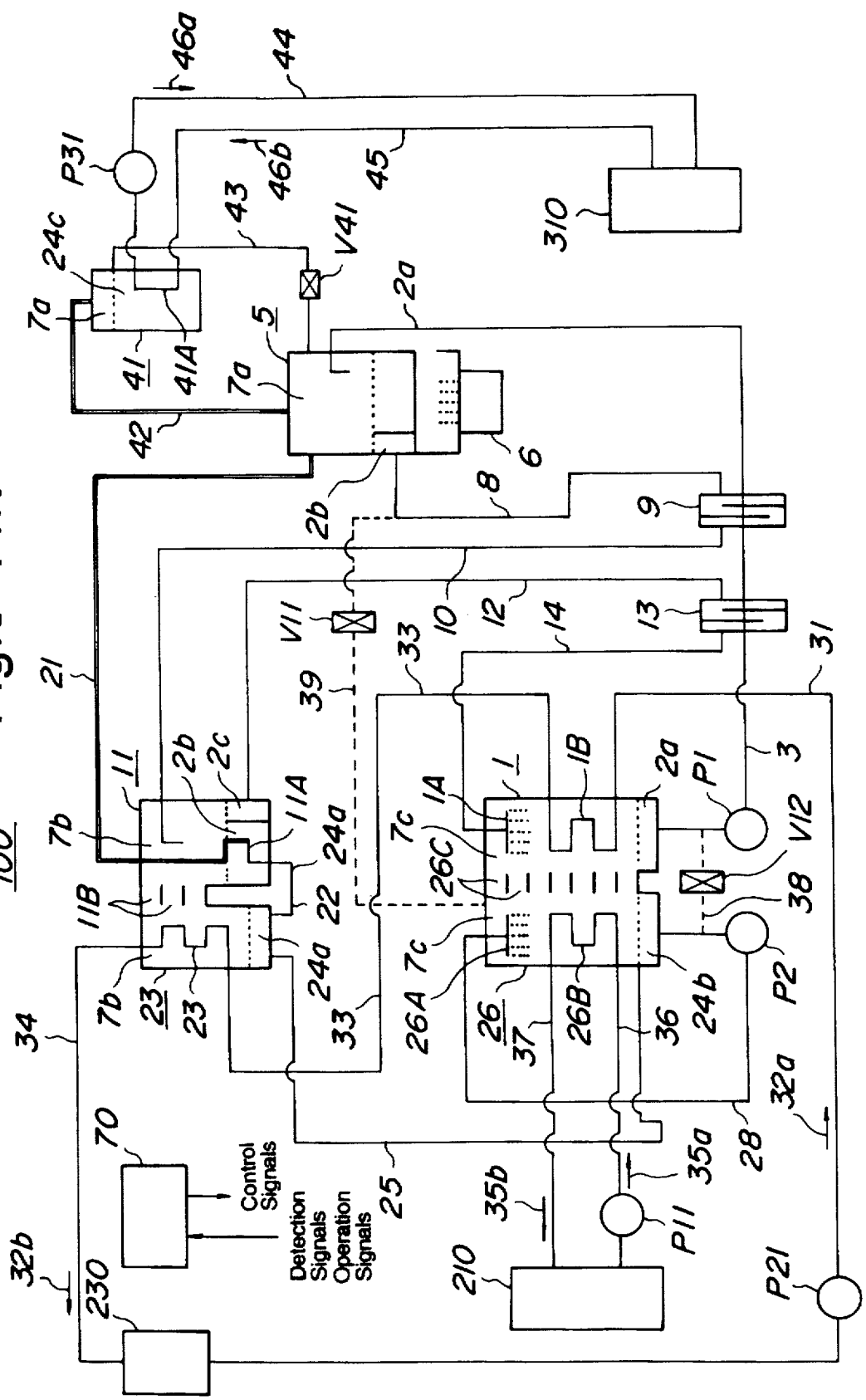
Figure 6:
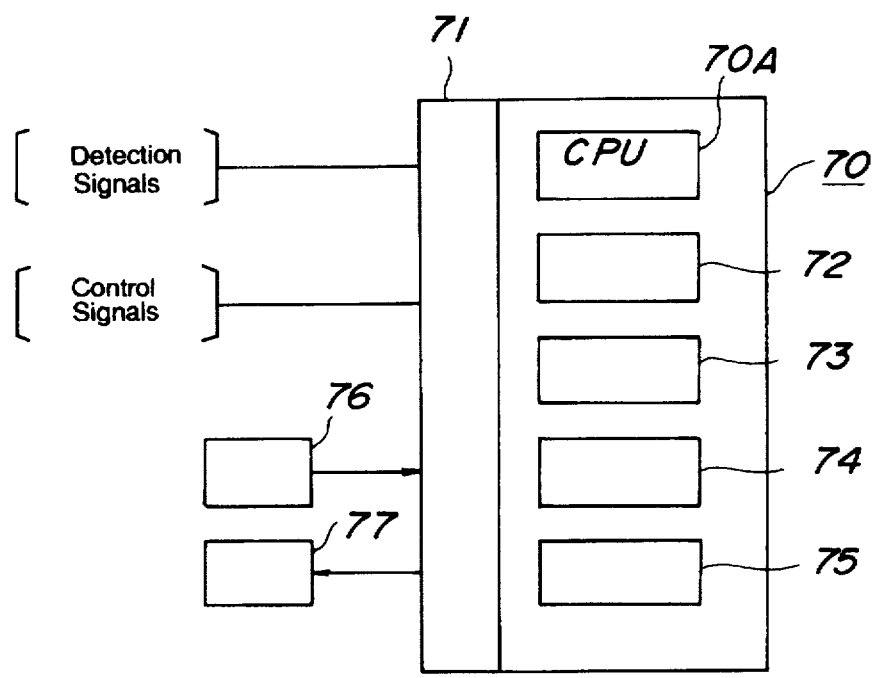

A first embodiment of the present invention is first described with reference to FIGS. 1, 2A and 2B. FIG. 1 shows key parts of the configuration of FIG. 5 and includes constituent parts required for the construction of the first embodiment. Only differences between the configuration of FIG. 1 and the configuration of FIG. 5 are that the circulation route of heating water 46a is provided in which a radiator 51 is provided between a pipe line 42 branching from a pipe line 44 and a pipe line 43 branching from a pipe line 45 and part of heating water 46a is supplied to the radiator 51 and then returned to a heating pipe 41A from the pipe line 43 through the pipe line 45 and that heating water 46a in the radiator 51 is cooled by connecting the radiation pipe 5 along the passage of cooling water 32a, that is, between a pipe line 52 branching from a pipe line 33 and a pipe line 53 branching from a pipe line 34 of return cooling water 32b and supplying part of the cooling water 32a to the radiation pipe 51A.

As shown in FIGS. 2A and 2B, for example, the radiator 51 is a shell and tube heat exchanger which is structured such that a plurality of long straight radiation pipes 51A are provided within a cylindrical container 50 to flow heating water 46a between each of the radiation pipes 51A and the container 50 and cooling water 32a in the radiation pipes 51A.

Partition plates 50A for partitioning an upper half portion of the container 50 and partition plates 50B for partitioning a lower half portion of the container 50 are arranged alternately at a plurality of appropriate sites in the container 50 to support the radiation pipes 51A and meander the passage of heating water 46a, thereby improving heat exchange efficiency.

By the control processing operation of the control unit 70, heating water 46a in the radiator 51 which becomes abnormally hot with the Joule heat of the pump P31 and the like is cooled with part of cooling water 32a by causing the switch valve V1 provided in a pipe line 52 to carry out required switch operation based on the output temperature of heating water 46a, i.e., a temperature value TD1 of a detection signal detected by a temperature detector S1 provided in the pipe line 44 near the outlet of the heating pipe 41A of the heater 41.

Control processing is carried out by a control processing flow program which is stored in a processing memory 72. The control processing flow program controls such that, when the normal temperature TS1 of heating water 46a is 55° C., an allowable temperature value TB1 is set to 77° C. and a cooling operation start temperature value TA1 is set to 80° C., all these values are stored in a data memory 74, the detection signal of the temperature detector Si is stored in a working memory 73 as the current temperature data value TD1, for example, 81° C., and the current temperature data value is compared with the cooling start temperature value TA1 (=80° C.) read from the data memory 74. When the current temperature data value TD1 is equal to or larger than the start temperature value TA1, the switch valve V1 is opened to flow cooling water 32a in the radiation pipes 51A to start cooling heating water 46a. The following current temperature data value TD1 is compared with the allowable temperature value TB1 (=77° C.). When the temperature of heating water 46a falls and the current temperature data value TD1 becomes equal to or lower than 77° C., the switch valve V1 is closed to stop flowing cooling water 32a in the radiation pipes 51A. That is, the program controls to ensure that the temperature of heating water 46a should stay between the cooling start temperature value TA1 and the allowable temperature value TB1 when it is abnormally high. In other words, when the temperature of heating water 46a exceeds 80° C., cooling operation is carried out, when the temperature becomes equal to or lower than 77° C., the switch valve V1 is closed to stop cooling operation, and when the temperature exceeds 80° C. again, cooling operation is carried out again.

Therefore, when the heating water 46a becomes abnormally hot, the control unit 70 controls such that the heating water 46a is cooled through heat exchange between the heating water 46a and the cooling water 32a in the radiator 51 to lower the temperature of the heating water 46a to a predetermined temperature value, i.e., 77° C. or lower.

As required, a control processing program for the cooling operation of the heating water 46a by the radiator 51 may be stored in the processing memory 72. The control processing program controls to optimize the amount of cooling in accordance with the temperature variations of the heating water 46a by changing the amount of cooling water 32a circulating in the radiation pipes 51A through the control of the flow rate thereof which is implemented by constructing the switch valve V1 with a control valve having a controllable opening and controlling the opening of this control valve in accordance with the temperature of the heating water 46a, or to optimize the amount of cooling in accordance with the temperature variations of the heating water 46a by changing the amount of the heating water 46a circulating in the radiator 51 through the control of the flow rate thereof which is implemented by constructing the switch valve V2 provided in a pipeline 47 with a control valve having a controllable opening and controlling the opening of this control valve in accordance with the temperature of the heating water 46a or through the control of the engine speed of the motor of a pump P31.

[Second Embodiment]

Figure 3:
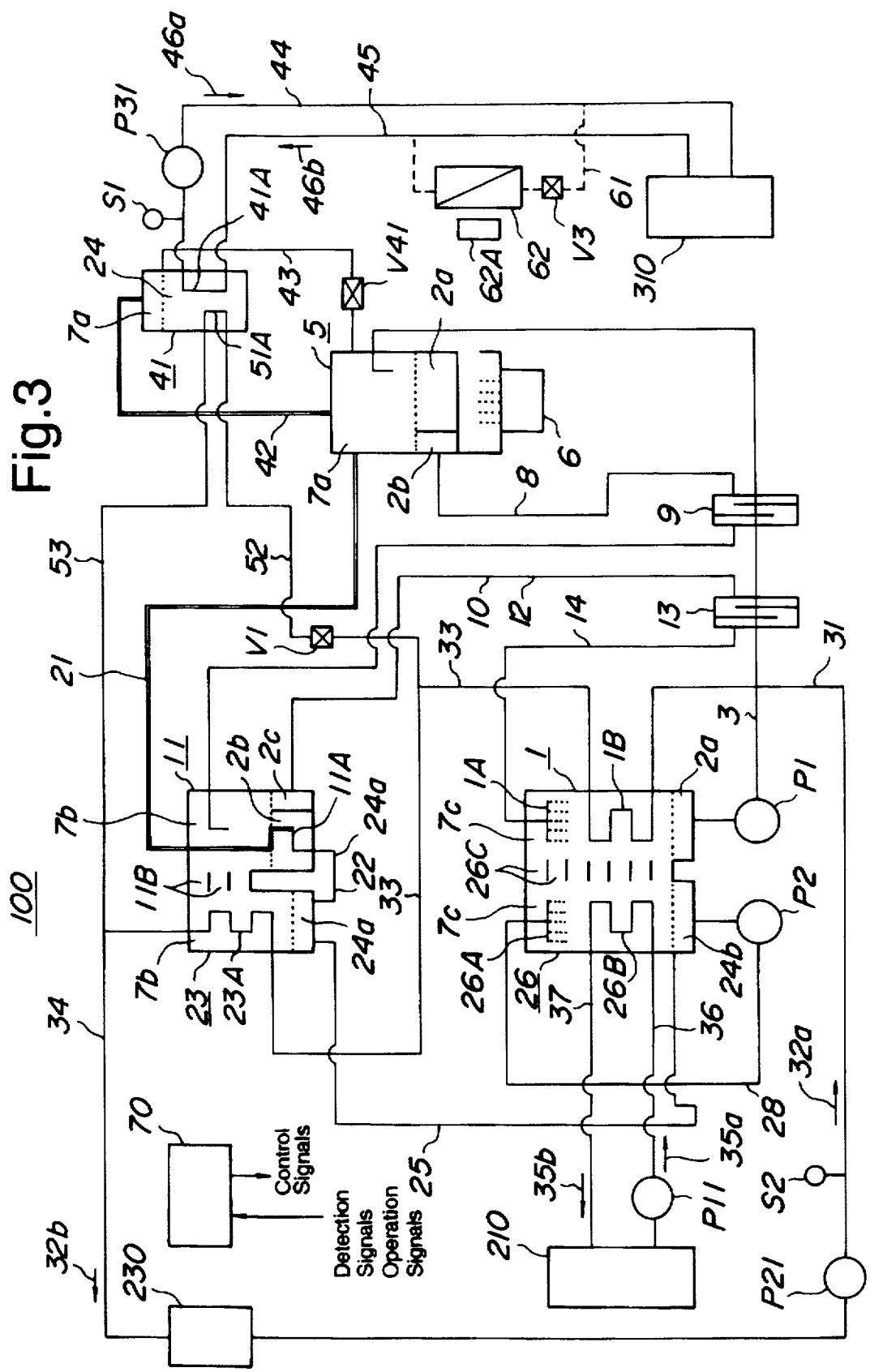

A second embodiment of the present invention is described with reference to FIGS. 3, 4A and 4B. The difference between the configuration of the first embodiment and the configuration of the second embodiment, i.e., difference between the configuration of FIG. 1 and the configuration of FIG. 3 is that the radiator 51 is not provided, the radiation pipes 51A are arranged in the heater 41, and the heating water 46a passing through the heating pipes 41A is cooled through heat exchange between the heating water 46a passing through the heating pipes 41A and the cooling water 32a passing through the radiation pipes 51A.

Various heat exchange methods for this cooling are conceivable. For example, as shown in FIGS. 4A and 4B, a heat exchange method which uses the refrigerant solution 24c as a heat medium can be employed. In FIG. 4A, heating pipes 41A formed of a plurality of long straight pipe lines and radiation pipes 51A formed of a plurality of long straight pipe lines which are smaller in number than the heating pipes 41A are arranged in the cylindrical container 40 in parallel to one another, the refrigerant solution 24c is caused to flow between the container 50 and each of the radiation pipes 51A, the heating water 46a is caused to flow in the heating pipes 41A, and the cooling water 32a is caused to flow in the radiation pipes 51A.

Like the radiator 51 of FIG. 2A, partition plates 40A for partitioning an upper half portion of the container 40 and partition plates 40B for partitioning a lower half portion of the container 40 are arranged alternately at a plurality of appropriate sites in the container 40 to support the radiation pipes 51A and the heating pipes 41A and meander the passage of the refrigerant solution 24c, thereby improving heat exchange efficiency.

The control processing operation of the control unit 7 for controlling the switch valve V1 based on the detection signal of the temperature detector Si is perfectly the same as in the first embodiment.

[Third Embodiment]

A third embodiment of the present invention is described with reference to FIG. 3. The difference between the second embodiment and the third embodiment is that the heating water 46a is cooled by flowing the cooling water 32a in the radiation pipes 51A and also cooled by an air-cooled heat exchanger 62 provided along the passage of the heating water 46a.

Stated more specifically, the heat exchanger 62 (called "air-cooled heat exchanger" in the present invention) for cooling with wind from a fan 62A is provided along a pipe line 61 connected to the pipe line 44 of the heating water 46a and the pipe line 45 of the return heating water 46b and the circulation of the heating water 46a into the air-cooled heat exchanger 62 is carried out by opening or closing a switch valve V3.

The heat exchanger 62 is a radiator formed of pipe lines equipped with a cooling fin which is generally and widely used as a plate-like heat exchanger, for example, and structured such that heating water 46a is caused to flow in a plurality of pipe lines arranged in a zigzag manner or in parallel to one another between thin aluminum plates which are placed one upon another with spacing therebetween and is cooled through heat exchange between air and the heat of the heating water 46a by causing air from the fan 62A to pass through the space between the aluminum plates.

A control processing flow program for the opening/closing operation of the switch valve V2 and the start/stop operation of the fan 62A is stored in the processing memory 72. The control processing flow program controls the control unit 70 such that the opening/closing operation of the switch valve V3 and the start/stop operation of the fan 62A are carried out simultaneously with the control of the opening/closing operation of the switch valve V1 in the first embodiment.

Therefore, when the heating water 46a becomes abnormally hot, the control unit 70 operates such that the heating water 46a is cooled in the heater 41 through heat exchange between the heating water 46a and the cooling water 32a and also cooled in the air-cooled heat exchanger 62 through heat radiation based on the detection signal of the temperature detector S1 to lower the temperature of the heating water 46a to a predetermined temperature value, i.e., 77° C. or lower.

[Fourth Embodiment]

A fourth embodiment of the present invention is described with reference to FIGS. 1 and 3. The difference between the configuration of the third embodiment and the configuration of the fourth embodiment is that a structure for cooling the heating water 46a by the air-cooled heat exchanger 62 in FIG. 3 is added to the first embodiment, that is, the configuration of FIG. 1, like the third embodiment. In other words, such constituent elements as the pipe line 61, heat exchanger 62, fan 62A and switch valve V3 are added to the configuration of FIG. 1.

Therefore, the control processing of the switch valves V1 and V3 and the fan 62A by the control unit 70 is perfectly the same as in the third embodiment.

[Fifth Embodiment]

A fifth embodiment of the present invention is described with reference to FIGS. 1, 2A and 2B. The difference between the configuration of the first embodiment and the configuration of the fifth embodiment is that the switch valve V1 is caused to carry out required opening or closing operation based on the inlet temperature of the cooling water 32a, i.e., the temperature value TD2 of the detection signal detected by the temperature detector S2 before the cooling water 32a is supplied to the cooling pipe 1B of the absorber 1 so that the cooling water 32a which is cold excessively, that is, abnormally, is heated.

A control processing program is stored in the processing memory 72. This control processing program controls in the following manner. When only the cooling water 35b is supplied from the pipe line 37 as supply water as shown in FIG. 1 and the heating water 46a is supplied from the heater 41 at the same time, namely, both cold water and hot water are supplied simultaneously, the normal temperature value TS2 of the cooling water 32a is set to 24° C., for example, and when cold or hot water 35b is supplied by switching supply water from the pipe line 37 to cold or hot water by switching the switch valve 11 as shown in FIG. 5 and the heating water 46a is supplied from the heater 41 at the same time, namely, cold or hot water is supplied, the normal temperature value TS2 of the cooling water 32a is set to 19° C., for example. These normal temperatures TS2 are stored in the data memory 74 in either case. The detection signal of the temperature detector S2 is detected at a time after the passage of a predetermined time ta from the time when the refrigerator starts operation to supply cold water 35b or cold or hot water 35b from the pipe line 37 to the time when the refrigerator enters a steady operation state, for example, 30 minutes, and the current temperature data value TD2 stored in the working memory 73, for example, 17° C. and the normal temperature value TS2 (=24° C.) or the normal temperature value (=19° C.) read from the data memory 74 are compared. When the current temperature data value TD2 is equal to or lower than the normal temperature value TS2, the switch valve V2 is opened to flow the cooling water into the radiation pipe 51A to start heating the cooling water 32a with the heating water 46a. Thereafter, when the current temperature data value TD2 reaches the normal temperature value TS2, the swi/tch valve V1 is closed. The passage of the above predetermined time ta is detected by storing data on the predetermined time ta=30 minutes in the data memory 72 and comparing data on an elapsed time tb obtained by counting time from the start of the operation of the refrigerator by a timer circuit 75 with data on the predetermined time ta read from the data memory 72. When data on the elapsed time tb reaches data on the predetermined time ta, the detection signal of the temperature detector S2 is detected.

As required a control processing program for the heating operation of the cooling water 32a in the radiator 51 may be stored in the processing memory 72. The control processing program controls to optimize the amount of cooling in accordance with the temperature variations of the cooling water 32a by changing the amount of the cooling water 32a circulating in the radiation pipes 51A through the control of the flow rate thereof which is implemented by constructing the switch valve V1 with a control valve having a controllable opening and controlling the opening of this control valve in accordance with the temperature of the heating water 46a, or to optimize the amount of cooling in accordance with the temperature variations of the cooling water 32a by changing the amount of the heating water 46a circulating in the radiator 51 through the control of the engine speed of the motor of the pump P31.

The reason why the normal temperature value TS2 of the cooling water 32a is set to 24° C., for example, when cold water and hot water are supplied simultaneously and the normal temperature value TS2 of the cooling water 32a is set to 19° C., for example, when cold or hot water is supplied is that, in the case of simultaneous supply of cold water and hot water, if the temperature of the cooling water 32a is low when the load amount of the cooling load 210 is small, the temperature of the evaporator 26 drops too much and the inside of the evaporator 26 may be frozen. Therefore, to prevent this, the normal temperature value TS2 is set to a higher temperature. Since such an accident does not occur in the case of supply of cold or hot water, the normal temperature value TS2 of the cooling water 32a is set to a lower temperature.

Therefore, when the temperature of the cooling water 32a becomes abnormally low, the control unit 70 controls such that the cooling water 32a is heated in the radiator 51 through heat exchange between the cooling water 32a and the heating water 46a based on the detection signal of the temperature detector S2. As a result, the temperature of the return cooling water 32b rises, the temperature of the cooling water 32a circulating in the radiator 230 also rises gradually, and the temperature of the cooling water 32a supplied from the pump P12 goes beyond the normal temperature value TS2 (=24° C.) or TS2 (=19° C.).

[Sixth Embodiment]

A sixth embodiment of the present invention is described with reference to FIGS. 3, 4A and 4B. The difference between the configuration of the fifth embodiment and the configuration of the sixth embodiment is that the radiator 51 is not provided, the radiation pipes 51A are arranged in the heater 41, and the cooling water 32a is heated through heat exchange between the cooling water 32a passing through the radiation pipes 51A and the heating water 46a passing through the heating pipes 41A. The control processing operation of the control unit 70, that is, control processing of controlling opening/closing the switch valve V1 based on the detection signal of the temperature detector S2 is perfectly the same as in the fifth embodiment.

[Summary of the Embodiments]

The constitution of each embodiment described above is summarized below.

(1) According to the first embodiment of the first aspect of the present invention, there is provided an absorption type refrigerator for cooling an absorber 1 in which refrigerant vapor 7c is absorbed into an absorption solution 2a by a first heat operation fluid, e.g., cooling water 32a, and a condenser 23 for condensing refrigerant vapor 7b and for heating a second heat operation fluid, e.g., heating water 46a, to be provided to a heating load 310 with high-temperature refrigerant vapor 7a separated from the absorption solution 2a in a regenerator 5, which comprises cooling means for cooling the second heat operation fluid, i.e., heating water 46a, through heat exchange between the first heat operation fluid, i.e., cooling water 32a, and the second heat operation fluid, i.e., heating water 46a, when the temperature of the second heat operation fluid, i.e., heating water 46a, is higher than a predetermined temperature, that is, an abnormally high temperature.

(2) According to the first embodiment of the second aspect of the present invention, there is provided an absorption type refrigerator which further comprises heat exchange amount control means for controlling the flow rate of the second heat operation fluid, i.e., heating water 46a, or the first heat operation fluid, i.e., cooling water 32a, to be provided for the heat exchange in accordance with the temperature variations of the second heat operation fluid, i.e., heating water 46a, in addition to the constituent elements of the refrigerator of the first aspect of the present invention.

(3) According to the second embodiment of the third aspect of the present invention, there is provided an absorption type refrigerator which comprises cooling means for cooling the second heat operation fluid, i.e. heating water 46a, through heat exchange between the second heat operation fluid, i.e., heating water 46a, and the first heat operation fluid, i.e., cooling water 32a, in a container, e.g., a heater 41, for heating the second heat operation fluid, i.e., heating water 46a, with the high-temperature refrigerant vapor 7a when the temperature of the second heat operation fluid, i.e., heating water 46a, is higher than a predetermined temperature, that is, an abnormally high temperature, in place of the cooling means of the first aspect of the present invention.

(4) According to the third and fourth embodiments of the fourth aspect of the present invention, there is provided an absorption type refrigerator which comprises:

first cooling means for cooling the second heat operation fluid, i.e., heating water 46a, through heat exchange between the second heat operation fluid, i.e., heating water 46a, and the first heat operation fluid, i.e., cooling water 32a, when the temperature of the second heat operation fluid, i.e., heating water 46a, is higher than a predetermined temperature, that is, an abnormally high temperature; and second cooling means, provided along the passage of the second heat operation fluid, i.e., heating water 46a, for cooling the second heat operation fluid, i.e., heating water 46a, with air, e.g., a heat exchanger 62 and a fan 62A, in place of the cooling means of the first aspect of the present invention.

(5) According to the fifth embodiment of the fifth aspect of the present invention, there is provided an absorption type refrigerator similar to the absorption type refrigerator of the first aspect of the present invention, which comprises heating means for heating the first operation fluid, i.e. cooling water 32a, through heat exchange between the second heat operation fluid, i.e., heating water 46a, and the first heat operation fluid, i.e., cooling water 32a, when the temperature of the first heat operation fluid, i.e., cooling water 32a, is lower than a predetermined temperature, that is, an abnormally low temperature.

(6) According to the sixth embodiment of the sixth aspect of the present invention, there is provided an absorption type refrigerator which comprises heating means for heating the first operation fluid, i.e., cooling water 32a, through heat exchange between the second heat operation fluid, i.e., heating water 46a, and the first heat operation fluid, i.e., cooling water 32a, in a container, e.g., a heater 41, for heating the second heat operation fluid, i.e., heating water 46a, with the high-temperature refrigerant vapor 7a when the temperature of the first heat operation fluid, i.e., cooling water 32a, is lower than a predetermined temperature, that is, an abnormally low temperature, in place of the heating means of the fifth aspect of the present invention.

[Modifications]

The present invention can be modified as follows.

(1) Water containing an anti-freeze such as ethylene glycol is used in place of the cooling water 32a.

(2) The switch valve V1 in the fifth and sixth embodiments is controlled such that it is simply opened for a predetermined time, for example, 30 minutes and then closed.

According to the first aspect of the present invention, as described above, since the second heat operation fluid is cooled through heat exchange with the first heat operation fluid to reduce the temperature of the second heat operation fluid when the temperature of the second heat operation fluid goes up excessively, it is not necessary to stop heating the second heat operation fluid temporarily or to stop the operation of the absorption type refrigerator. Therefore, the operation of the refrigerator can be continued and hence, operation can be simplified.

According to the second aspect of the present invention, since the amount of the heat operation fluid to be heat exchanged is controlled in accordance with the temperature variations of the second heat operation fluid, a heat loss such as excessive and wasteful heat radiation from the second heat operation fluid to the first heat operation fluid can be suppressed. Therefore, there is such an advantage that the substantial operation efficiency of the absorption type refrigerator can be improved, in addition to the advantage of the first aspect of the present invention.

According to the fourth aspect of the present invention, since the second operation fluid is cooled through eat exchange with the first heat operation fluid and through heat radiation by cooling with air to reduce the temperature of the second heat operation fluid when the temperature of the second heat operation fluid goes up excessively, the temperature of the second heat operation fluid can be reduced in a shorter period of time without fail even in summer when the temperature of the cooling water 32a is high.

According to the fifth aspect of the present invention, since the first heat operation fluid is heated through heat exchange with the second operation fluid to increase the temperature of the first heat operation fluid when the temperature of the first heat operation fluid drops excessively, the first heat operation fluid can be heated in a short period of time even in winter when the temperature of the first operation fluid is excessively low. Therefore, it is possible to avoid the stoppage of the absorption type refrigerator due to an excessively low temperature of the first heat operation fluid and ensure the start of the absorption type refrigerator.

Further, according to the third and sixth aspects of the present invention, since heat exchange between the first heat operation fluid and the second heat operation fluid is carried out within the heater, the need for a radiator and its accessory pipings is eliminated. Therefore, there is such an advantage that the refrigerator can be made compact and inexpensive in addition to the advantages of the above first and fifth aspects of the present invention.

What is claimed is:

1. An absorption type refrigerator with a cooled absorber in which refrigerant vapor is absorbed into an absorption solution by a first heat operation fluid and a condenser for condensing refrigerant vapor and for heating a second heat operation fluid to be provided to a heating load with high-temperature refrigerant vapor separated from the absorption solution in a regenerator, wherein the absorption type refrigerator comprises cooling means for cooling the second heat operation fluid through heat exchange between the first heat operation fluid and the second heat operation fluid when the temperature of the second heat operation fluid is higher than a predetermined temperature.

2. An absorption type refrigerator for cooling an absorber in which refrigerant vapor is absorbed into an absorption solution by a first heat operation fluid and a condenser for condensing refrigerant vapor and for heating a second heat operation fluid to be provided to a heating load with high-temperature refrigerant vapor separated from the absorption solution in a regenerator, wherein the absorption type refrigerator comprises:

cooling means for cooling the second heat operation fluid through heat exchange between the first heat operation fluid and the second heat operation fluid when the temperature of the second heat operation fluid is higher than a predetermined temperature; and heat exchange amount control means for controlling the flow rate of the second heat operation fluid or the first heat operation fluid to be provided for the heat exchange in accordance with the temperature variations of the second heat operation fluid.

3. An absorption type refrigerator for cooling an absorber in which refrigerant vapor is absorbed into an absorption solution by a first heat operation fluid and a condenser for condensing refrigerant vapor and for heating a second heat operation fluid to be provided to a heating load with high-temperature refrigerant vapor separated from the absorption solution in a regenerator, wherein the absorption type refrigerator comprises cooling means for cooling the second heat operation fluid through heat exchange between the second heat operation fluid and the first heat operation fluid in a container for heating the second heat operation fluid with the high-temperature refrigerant vapor when the temperature of the second heat operation fluid is higher than a predetermined temperature.

4. An absorption type refrigerator for cooling an absorber in which refrigerant vapor is absorbed into an absorption solution by a first heat operation fluid and a condenser for condensing refrigerant vapor and for heating a second heat operation fluid to be provided to a heating load with high-temperature refrigerant vapor separated from the absorption solution in a regenerator, wherein the absorption type refrigerator comprises:

first cooling means for cooling the second heat operation fluid through heat exchange between the second heat operation fluid and the first heat operation fluid when the temperature of the second heat operation fluid is higher than a predetermined temperature; and second cooling means, provided along the passage of the second heat operation fluid, for cooling the second heat operation fluid with air.

5. An absorption type refrigerator for cooling an absorber in which refrigerant vapor is absorbed into an absorption solution by a first heat operation fluid and a condenser for condensing refrigerant vapor and for heating a second heat operation fluid to be provided to a heating load with high-temperature refrigerant vapor separated from the absorption solution in a regenerator, wherein the absorption type refrigerator comprises heating means for heating the first operation fluid through heat exchange between the second heat operation fluid and the first heat operation fluid when the temperature of the first heat operation fluid is lower than a predetermined temperature.

6. An absorption type refrigerator for cooling an absorber in which refrigerant vapor is absorbed into an absorption solution by a first heat operation fluid and a condenser for condensing refrigerant vapor and for heating a second heat operation fluid to be provided to a heating load with high-temperature refrigerant vapor separated from the absorption solution in a regenerator, wherein the absorption type refrigerator comprises heating means for heating the first operation fluid through heat exchange between the second heat operation fluid and the first heat operation fluid in a container for heating the second heat operation fluid with the high-temperature refrigerant vapor when the temperature of the first heat operation fluid is lower than a predetermined temperature.

* * * * *